United States Patent [19]
Davis

[11] 4,357,112
[45] Nov. 2, 1982

[54] BEATER

[76] Inventor: William L. Davis, 880 E. First St. South, Salt Lake City, Utah 84102

[21] Appl. No.: 217,584

[22] Filed: Dec. 18, 1980

[51] Int. Cl.³ .......................... B01F 7/00; B01F 15/06
[52] U.S. Cl. .................................... 366/279; 366/149; 366/192
[58] Field of Search .............. 366/279, 149, 341, 292, 366/331, 297, 347, 96, 97, 100, 150, 184, 192, 241, 242, 325, 326, 193

[56] References Cited

U.S. PATENT DOCUMENTS

| | | | |
|---|---|---|---|
| 1,981,010 | 11/1934 | Torson | 366/279 |
| 2,671,646 | 3/1954 | Lindsey | 366/149 |
| 3,385,568 | 5/1968 | Gray | 366/149 |

FOREIGN PATENT DOCUMENTS

1239864  7/1960  France ............................... 366/297

*Primary Examiner*—Edward J. McCarthy
*Attorney, Agent, or Firm*—William P. Green

[57] ABSTRACT

A device for preparing a beaten product and including a beater assembly driven rotatively about a generally vertical axis, with the beater assembly including a rotor body having vertically spaced upper and lower portions containing recesses, and a blade unit having upper and lower projections receivable within said recesses to connect the blade unit to the body, and with the blade unit being adapted for connection to the body by insertion of an upper one of the projections into an upper recess followed by swinging movement of the lower portion of the blade unit from a position in which a lower one of the projections is offset horizontally from a corresponding one of the recesses to a position in which the lower projection is above and can be moved downwardly into the lower recess.

16 Claims, 9 Drawing Figures

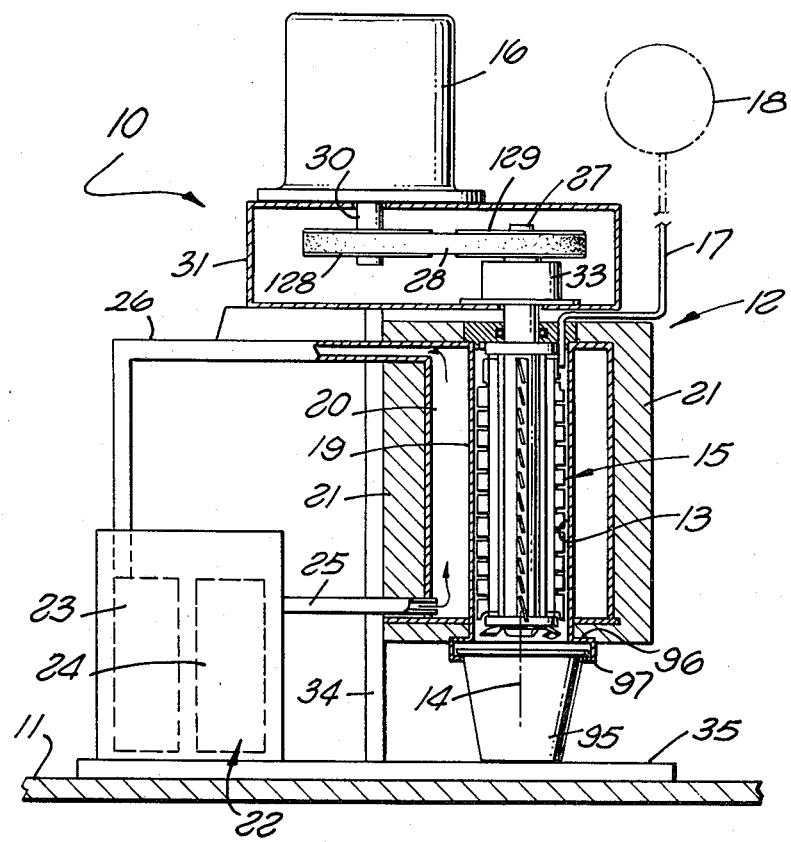
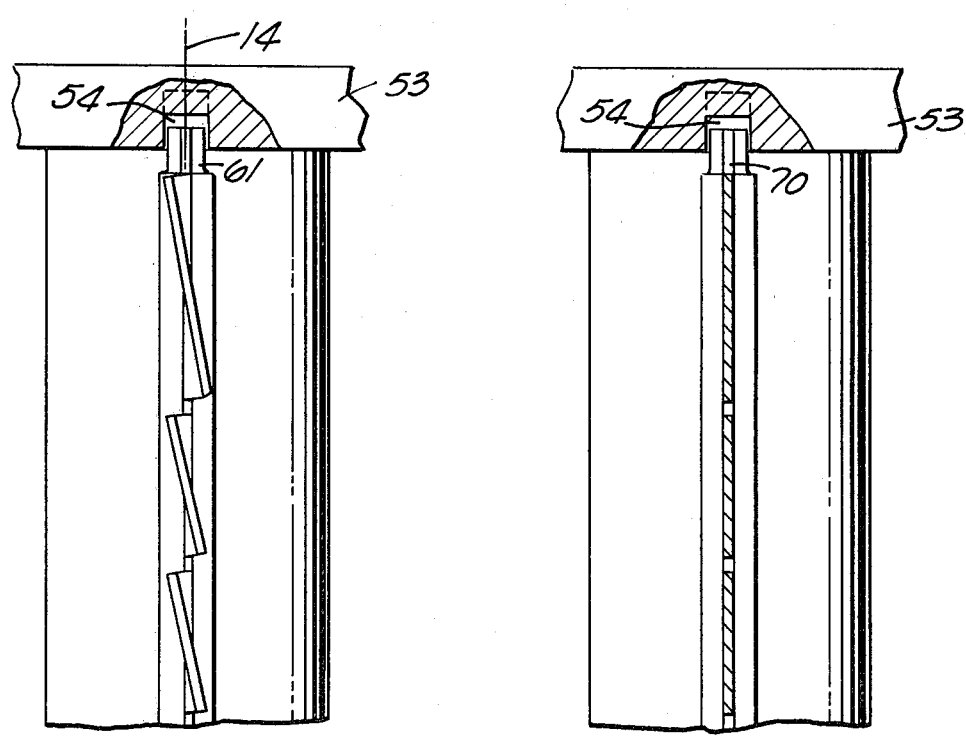
FIG. 1
FIG. 3
FIG. 4

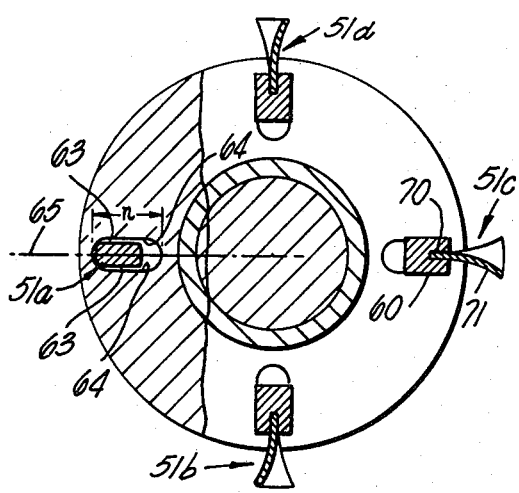
FIG. 5
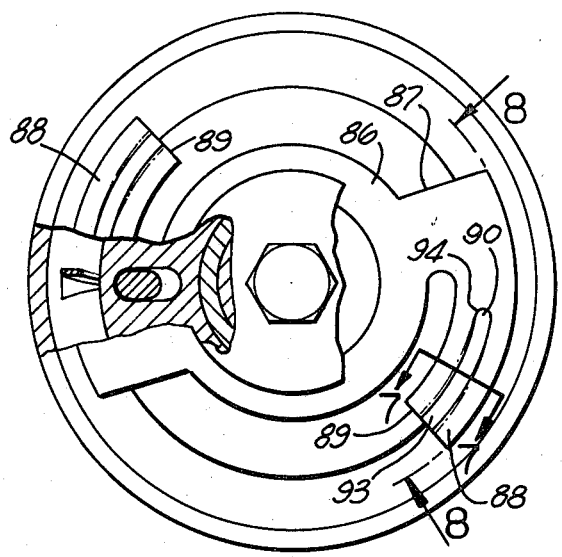
FIG. 6
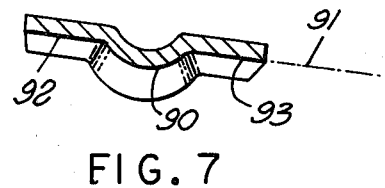
FIG. 7
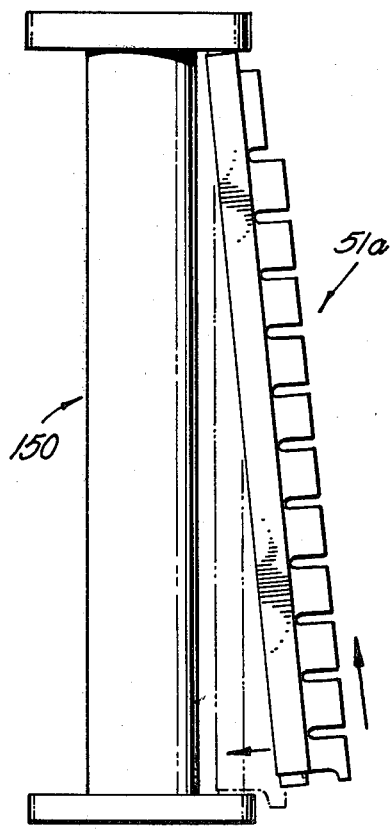
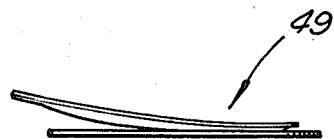
FIG. 8
FIG. 9

BEATER

BACKGROUND OF THE INVENTION

This invention relates to improved machines for preparing beaten products, such as for example frozen food products prepared by beating fruit juices or other ingredients at low temperature, or other solid or liquid substances whose preparation includes subjection to a rapidly turning rotary beater unit.

U.S. Pat. Nos. 2,671,646 and 3,385,568 show a type of beater unit including a vertically extending refrigerator chamber and a beater assembly which is mounted in the chamber to turn about a vertical axis and which includes blades projecting into close proximity to the wall of the chamber. While the rotor is turning, the ingredients of a product to be prepared by the device are inserted into the upper end of the chamber, and as the ingredients fall downwardly they are agitated violently by the blades of the rotor to an extent forming a frozen food product similar to ice cream by the time the beaten substance is discharged downwardly from the lower end of the chamber into a cup or other receptacle. In U.S. Pat. No. 3,385,568, the blades are carried by the rotor at a location vertically between two spaced flanges formed on the rotor body, with retaining pins extending downwardly through the flanges at locations holding the blades against separation from the body.

SUMMARY OF THE INVENTION

The present invention provides a beater device of the above discussed general type, having a vertically extending rotatively driven bladed beater assembly within a vertically extending chamber, but with the beater assembly being especially constructed to facilitate rapid and complete detachment of the blades from the rotary body for cleaning, in order to permit maintenance of the overall device in a sanitary condition at all times. Such disassembly of the rotor parts is especially desirable in the case of food products, which may become contaminated unless all food contacting portions of the device can be washed thoroughly at frequent intervals. If all of the food contacting portions and surfaces of a food handling device of the discussed general type cannot be easily, quickly and thoroughly cleaned of all possible contamination at least daily, health authorities may refuse to permit use of the device in commercial applications, with the result that the unit, regardless of any other attributes, may become completely impractical for actual manufacture and sale.

Easy and rapid assembly and disassembly of the beater of the present invention is attained by forming vertically extending blade units of the device to have an upwardly extending mounting projection at the upper end of each blade unit receivable within a downwardly facing coacting recess in an upper portion of the rotor body, and to have a downwardly extending projection at the lower end of the blade unit receivable within an upwardly facing recess formed in a lower portion of the rotor body, with the projections and recesses being so formed that the blade unit is effectively connected to and carried by the rotor body for rotation therewith when in operation, but is easily separable from the rotor body by a simple manipulation of the blade unit requiring no separate fasteners, retaining elements, or tools for disassembly of the parts. In a connected position of the blade unit relative to the rotor body, the upper and lower projections of the blade unit are received within the recesses to interconnect the parts for rotation together. Disassembly is facilitated by forming the parts to enable limited upward movement of the blade unit relative to the rotor body from the discussed connected position to an elevated position in which the lower projection is withdrawn from and located above the bottom recess and can swing horizontally relative thereto to detach the blade unit from the rotor body. Reconnection of the blade unit to the rotor body is attained in reverse manner, by first inserting the upper projection into the upper recess and to the discussed elevated position, so that the lower portion of the blade unit can then be swung inwardly or horizontally to a position in which the bottom projection can move downwardly into interlocked relation within the bottom recess. Preferably a number of such blade units are provided on the rotor body, at vertically spaced locations, desirably four such units.

The projections and recesses may be so shaped and dimensioned that, when the parts are connected together, the blade unit is free for limited radial movement relative to the rotor unit and toward and away from the side wall of the chamber within which the beater assembly is positioned. Preferably, in the outermost position to which the blade unit is movable, the outer edges of the blades are spaced a short distance from the side wall of the chamber. If the product accumulates on the chamber wall to an excessive extent, the blade unit can retract inwardly relative to the rotor body to avoid damage to the blades or chamber.

Another novel feature of the invention relates to formation of the upper portion of the rotor body in a manner optimizing introduction of ingredients into the upper portion of the chamber, and assuring effective beating of the product and its displacement downwardly within and through the chamber. For this purpose, the upper blade or blades of the beater assembly may be cut away radially to a reduced diameter as compared with other blades therebeneath, and the ingredients may be injected into the chamber at a location radially between the upper cutaway blades and the chamber wall. An ingredient inlet tube may extend downwardly into this space or gap radially between the upper blade or blades and the chamber wall, and may emit the ingredients into that gap. At the lower end of the beater assembly, the lowermost blade or blades desirably have portions which extend downwardly to a location radially opposite and outwardly of a bottom flange which supports the lower portions of the blade units.

To effect the final downward displacement of the product from the lower end of the device, the beater assembly may carry a product feed or discharge element of a general type shown in the above discussed prior U.S. Pat. No. 3,385,568, and having arcuately extending arms or blades which press downwardly against the top surface of the product in a cup or other receptacle. Another feature of the present invention relates to a preferred configuration which is given the arcuate arm or arms of such a product feed device, in order to shape the upper surface of the product in a manner forming a decorative circular line or depression in that upper surface.

BRIEF DESCRIPTION OF THE DRAWINGS

The above and other features and objects of the invention will be better understood from the following detailed description of the typical embodiment illustrated in the accompanying drawings, in which:

FIG. 1 is a vertical section through a beater constructed in accordance with the invention, with certain of the elements being illustrated diagrammatically;

FIG. 3 is a fragmentary vertical section taken on line 3—3 of FIG. 2, and showing an upper portion of one of the blade units as viewed looking radially inwardly toward the axis of the device;

FIG. 4 is a fragmentary vertical section taken on line 4—4 of FIG. 2;

FIG. 5 is a horizontal section taken on line 5—5 of FIG. 2;

FIG. 6 is a bottom plan view, partially in section, taken on line 6—6 of FIG. 2;

FIG. 7 is an enlarged vertical section taken on line 7—7 of FIG. 6; and

FIG. 8 is a fragmentary view taken on line 8—8 of FIG. 6.

FIG. 9 shows assembling one of the blade units to the rotor body.

DESCRIPTION OF THE PREFERRED EMBODIMENT

Figure 2:
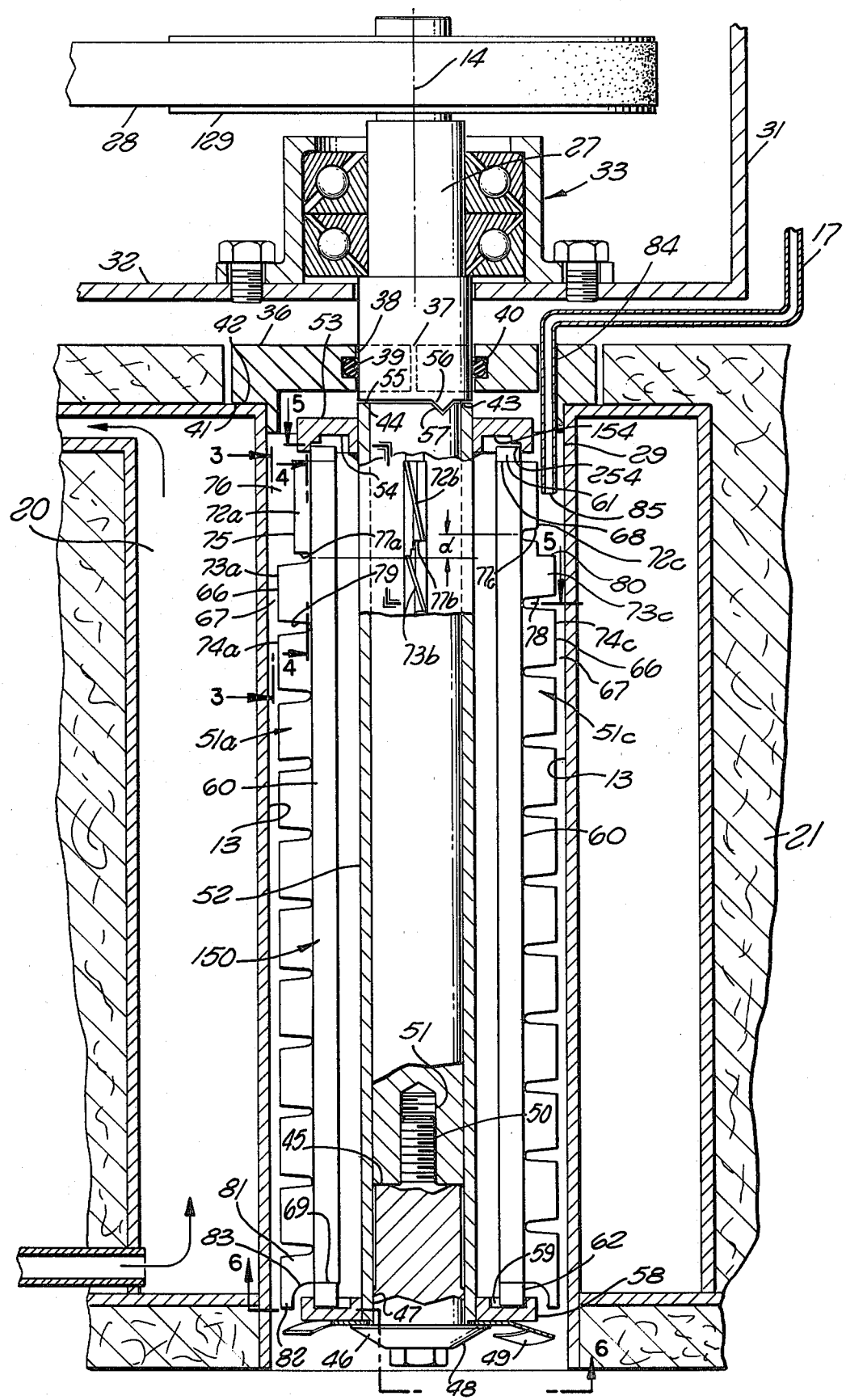
FIG. 2 is an enlarged fragmentary vertical section through the freezing chamber and beater assembly and certain related parts of the FIG. 1 device.

FIG. 1 illustrates generally at 10 a freezer unit constructed in accordance with the invention, typically shown resting on a table or bench surface 11. The device 10 includes a structure 12 containing and defining a vertically extending cylindrical chamber 13 centered about a vertical axis 14 and within which a beater assembly 15 is driven rotatively about that axis by a motor 16. A liquid to be frozen is introduced into the upper end of the chamber through an inlet tube 17 leading from a pressurized source 18 of the liquid. This liquid may be an appropriate fruit juice, a freezable mix, or any other desired ingredient or mixture of ingredients which is to be frozen or at least chilled, and beaten, as it passes downwardly through chamber 13. Source 18 may typically be a container holding the product ingredients in liquid form, with the ingredients being pressurized by compressed air contained in the upper portion of container 18 above the liquid level.

The side wall of chamber 13 may be formed by a vertical straight cylindrical tube 19 centered about axis 14 and formed of a material such as stainless steel capable of withstanding corrosion in use. Tube 19 and the chamber 13 within its interior are cooled by passage of a refrigerating liquid through an annular compartment 20 disposed about the chamber wall 19, with heat insulating material 21 being received about and insulating the refrigerant compartment 20. A refrigerating unit 22, including a compressor 23 and condenser 24, delivers a pressurized refrigerant, such as Freon, in liquid form, through an inlet line 25 into the lower end of compartment 20, to evaporate within that compartment and discharge from its upper end through a line 26 to the inlet side of compressor 23, for compression thereby and reconversion to liquid form in the condenser 24.

Beater assembly 15 is carried and driven by a vertical shaft 27 (FIG. 2), which is centered and turns about the vertical axis 14 of the device, and which may be driven by motor 16 either directly or indirectly through a belt 28 engaging sheaves or pulley wheels 128 or 129 on the vertical shaft 30 of the motor and shaft 27. The motor is preferably an induction type motor turning at a speed of 1750 revolutions per minute, with the two sheaves 128 and 129 preferably being of the same diameter to form a one to one drive ratio acting to turn shaft 27 at that same speed of 1750 revolutions per minute.

The belt drive and the upper end of shaft 27 may be contained within a protective housing 31, having a bottom wall 32 carrying a thrust bearing assembly 33 which journals shaft 27 for rotation about axis 14 and effectively retains it against either upward or downward axial movement. Housing 31 and the motor 16, as well as the compartment structure 12, may all be carried by a support column or columns 34 or other support structure projecting upwardly from a horizontal base 35 of the device.

The upper end of compartment 13 may be closed by an upper horizontal cover 36, which may be formed in two halves meeting in a diametrical vertical plane containing axis 14, as represented at 37 in FIG. 2. These two halves form together an annular horizontal wall extending about shaft 27 and having an inner cylindrical surface 38 annularly engaging a rubber O-ring 39 contained within a groove 40 in cover 36 to form a seal between the shaft 27 and the structure 36. The two halves of the cover structure 36 may have downwardly projecting complementary portions 29 forming together a cylindrical flange fitting within and locating the cover within the upper portion of chamber 13. An annular shoulder 41 formed by the two complementary halves of cover structure 36 is engageable downwardly against a top horizontal wall 42 of the refrigerant compartment or passage 20 to support the cover in the illustrated position of FIG. 2.

At a location beneath the level of O-ring 39, shaft 27 has an annular downwardly facing shoulder 43, and beneath that shoulder the shaft has a reduced diameter externally cylindrical portion 44 continuing at that reduced diameter to the lower extremity 45 of the shaft. The beater assembly 15 is removably receivable about this reduced diameter portion 44 of the shaft, and is retained on the shaft by a lower retaining element 46 having an outer cylindrical surface 47 forming a continuation of the outer surface 44 of the shaft and having an enlarged diameter head 48 at its lower end for securing the beater assembly and a lower product discharge element 49 in place on the shaft. Retaining part 46 has an upper reduced diameter threaded portion 50 which is connectable into a threaded bore 51 to attach the parts together and in assembled condition.

The beater assembly includes a rotor body 150 and several, preferably four, evenly circularly spaced vertically extending blade units 51a, 51b, 51c and 51d. These four units are identical except with respect to the vertical staggering of the blades which will be discussed in detail at a later point.

Rotor body 150 includes a vertical central tube 52 which is externally and internally of straight cylindrical configuration and centered about axis 14 and is a close fit on the outer cylindrical surfaces 44 and 47 of parts 27 and 46. At its upper end, tube 52 carries a ring 53 which is a close fit on tube 52 and is rigidly secured thereto as by welding, and which therefore forms a flange which is annular about axis 14 except insofar as the undersurface of the flange is interrupted by four evenly circularly spaced recesses 54 for retaining blade units 51a, 51b, 51c and 51d. The upper extremity of tube 52 projects upwardly a short distance beyond flange 53, and has an upper annular transverse surface 55 engageable upwardly against shoulder 43 when the rotor body is clamped in place by part 46. To transmit rotary motion from shaft 27 to rotor body 50, there may be a lug 56 projecting downwardly from shoulder 43 and receivable within a typically triangular notch 57 formed in the upper edge of tube 52 to key the parts together rotatively.

At the lower end of tube 52, there is provided about that tube a second ring 58, welded or otherwise rigidly secured to tube 52 and forming a lower flange which is essentially annular and of the cross-section illustrated in FIG. 2 except insofar as the upper surface of the flange is interrupted by four evenly circularly spaced upwardly opening recesses 59 aligned vertically with the downwardly facing recesses 54 of flange 53.

Each of the blade units 51a, 51b, etc. includes a rigid vertically extending blade carrier 60, forming at its upper end a projection 61 receivable within one of the recesses 54 in flange 53, and forming at its lower end a second projection 62 receivable within a corresponding one of the recesses 59 of bottom ring 58. These upper and lower projections 61 and 62 are of the generally rectangular horizontal sectional configuration illustrated in the lefthand portion of FIG. 5, having parallel vertical opposite side faces 63 slidably engaging and fitting closely between parallel vertical opposite side wall surfaces 64 of the corresponding recess 54 or 59 to guide the projection and each of the blade units for limited radial movement relative to the rotor body, along axes 65 extending perpendicular to and intersecting the vertical central axis 14 of the device. As seen in FIG. 5, each of the grooves 54 and 59 has a radial extent r somewhat greater than the radial extent of the contained projection 61 or 62, to permit such limited radial movement of the blade units. The radially outward movement of the blade units is limited in the position illustrated in FIG. 5, in which the outermost edges 66 of the blades (FIG. 2) are received closely proximate to but spaced a short distance from chamber wall 13, as represented by the gap 67 in FIG. 2. This gap may typically be 3/32 of an inch in radial dimension.

Each of the upper projections 61 is of uniform horizontal section corresponding to that illustrated in FIG. 5 from the upper extremity of the projection downwardly to the level identified by the number 68 in FIG. 2. Similarly, each of the lower projections 62 is of that same horizontal section from its lower extremity upwardly to the level identified by the number 69 in FIG. 2. Vertically between these two levels 68 and 69, the blade carrier member 60 is of the slightly enlarged cross-section represented in the right portion of FIG. 5. More particularly, that main portion of member 60 may be of generally rectangular horizontal section, but contains a vertical groove 70 lying in one of the vertical radial planes 65 and facing radially outwardly and extending the entire distance between the levels 68 and 69 of FIG. 2. Contained partially within this groove 70, each of the blade units 51a, 51b, etc. includes a blade element 71, which may be stamped from a single strip of stainless steel and cut to the configuration illustrated in the figures to form radially outwardly projecting blades such as those identified by the numbers 72a, 73a, 74a, etc. in FIG. 2. The portion of this blade forming element which is received within groove 70 is permanently welded, brazed, or otherwise rigidly secured therein.

To describe the blade configuration of unit 73a in FIG. 2 more specifically, it is noted that the upper blade 72a of that unit has a radial dimension less than that of the other blades therebeneath, so that the outer edge 75 of blade 72a is spaced farther inwardly from wall 13 of the chamber than are the edges 66 of the other blades. This leaves a gap 76 of increased radial dimension between the upper blade 72a and the cylinder wall. It is also noted that the upper blade 72a is desirably of somewhat greater vertical extent than the other blades 73a, 74a, etc. For example, blade 72a may have a vertical extent of one inch, while the other blades may have a vertical extent of 11/16". All of the blades 72a, 73a, etc. are twisted as they advance radially outwardly, as illustrated in FIG. 2, so that their outer edges lie in planes intersecting axis 14 at an acute angle, with the twist being in a direction such that the angularity of the blades tends to cause the product to advance downwardly within the chamber as the beater assembly turns. The rate of twist of the upper blade 72a should be more abrupt than the twist of the other blades therebeneath, as will also be understood from FIG. 3.

Referring now to the blade unit 51c which is diametrically opposite unit 51a, and whose blades are the same as the blades of unit 51a except that each of the blades of the unit 51c is offset or staggered slightly upwardly relative to the corresponding blade of unit 51a. For example, the lower edge 77c of the top blade 72c of unit 51c may be spaced upwardly above the level of the bottom edge 77a of top blade 72a of unit 51a a distance d, and the lower edges 78 of each of the other blades of unit 51c are spaced the same distance above the corresponding edges 79 of the blades of unit 51a. In order to permit the gap 76 between the upper portion of the beater assembly and the cylinder wall to have the same vertical extent at all locations, an upper portion of the second blade 73c of unit 51c may be cut away at 80.

The blades of unit 51b may correspond to the blades of units 51a and 51c, but be staggered vertically midway between the levels of the blades of the two units 51a and 51c. For example, the upper blade 72b of unit 51b has its lower edge 77b midway between the levels of edges 77a and 77c, and the upper portion of the second blade 73b is cut away in the manner represented at 80 but to a vertical depth only half that of the cut away region 80 in unit 51c. The fourth blade unit 51d (at the back of the beater assembly as viewed in FIG. 5) has the lower edge of its top blade offset or staggered upwardly above the level of edge 77c a distance corresponding to the distance that edge 77b is spaced beneath the level of edge 77c. Also, the next to top blade of unit 51d is cut away in the manner represented at 80, but to a slightly greater extent than is represented at 80, so that the uniform vertical dimension of the gap 76 is maintained at the location of all of the blade units.

The lowermost blades 81 of the four blade units are of slightly different vertical dimension as dictated by the vertically offset or staggered relation of the different blade units. Also, each of those lowermost blades is shaped to have a portion 82 which projects downwardly at a location radially outwardly of and radially opposite the outer cylindrical surface of the lower flange 58. To form this portion 82, the strip of material forming each of the blade elements has a bottom edge 83 which extends radially outwardly from the corresponding carrier member 60 and then curves downwardly as illustrated in FIG. 2 to have a vertical portion directly opposite and spaced from the outer cylindrical surface of flange 58.

The liquid inlet tube 17 extends downwardly through an opening 84 in one of the halves of cover structure 36, and projects downwardly into the gap 76 to terminate at a location 85 preferably about midway between the upper and lower ends of that gap. The portion of the tube projecting downwardly into the gap may be directly vertical and parallel to axis 14, and opens downwardly, and may be of a radial extent to occupy substantially the entire radial extent of the gap without contacting the outer edges of the blades.

All of the parts of the beater assembly which contact the food product should be formed of a material which will not corrode or be otherwise affected by contact with the ingredients of the product, and more particularly all of these parts including the rotor body and the four blade units, as well as bottom parts 46 and 49, may be formed of stainless steel.

The bottom part 49 may be stamped of sheet metal to form an inner mounting ring portion 86 (FIG. 6), having two diametrically projecting arms 87 terminating in two arcuately extending arms 88. The arms 87 and 88 may be flared or bent downwardly as seen in FIG. 2, to be inclined slightly with respect to the horizontal. Near its trailing end 89, each of the arcuate arms 88 is deformed to the cross-sectional configuration illustrated in FIG. 7, to form a central projection 90 extending downwardly beneath the plane 91 of the undersurfaces 92 and 93 at opposite sides of portion 90. More particularly, it is preferred that the projection 90 have the downwardly convex preferably approximately semi-circular cross-sectional configuration of FIG. 7, with the cross-section of FIG. 7 continuing between the locations 93 and 94 of FIG. 6, and with the projection 90 extending arcuately about the axis 14 of rotation of the beater assembly.

To now describe the manner of assembly of the beater structure, assume first of all that the rotor body 150 is detached from shaft 27, and that the blade units 51a, 51b, etc. are initially separated from the rotor body 150. Each of the blade units can then be connected to body 150 by merely holding the blade unit in the inclined position represented in FIG. 9, inserting the top projection 61 of that blade unit upwardly into one of the recesses 54 in the top flange 53 of the rotor body, and then swinging the lower portion of the blade unit radially inwardly from the FIG. 9 position of reception outwardly beyond the lower flange to a position above the flange as represented in broken lines in FIG. 9. During such inward swinging movement of the lower portion of the blade unit, that unit is inserted upwardly into the top recess 54 farther than the full line position of FIG. 2, so that the blade unit is in an elevated position (broken lines in FIG. 9) in which the lower extremity of the bottom projection 62 is above the level of the top surface of bottom flange 58. In this elevated position, the bottom projection 62 can move to a position above the corresponding bottom recess 59, following which the entire blade unit is lowered from the broken line position of FIG. 9 to the position of FIG. 2, in which the bottom end of projection 62 rests on the bottom wall of recess 59 to support the blade unit at that location. To enable the discussed upward movement of the blade unit to an elevated position above the full line position of FIG. 2, each of the upper recesses 54 has a radially inner portion 154 which extends upwardly into flange 53 to a level spaced a substantial distance above the upper end of the corresponding projection 61 in the connected position of FIG. 2. Also, the shoulder formed on part 60 at the level 68 of FIG. 2, and the upper extremities of the top blades, are spaced beneath the undersurface of flange 53 far enough to allow the discussed upward movement of the blade unit to the elevated position in which the lower projection can be moved into recess 59. After the blade unit has been allowed to move downwardly from that elevated position to the connected or active position of FIG. 2, the uppermost portion of top projection 51 still remains within the lower portion of the corresponding recess 54, so that the blade unit is effectively confined and secured to the rotor body at both its upper and lower ends, and is guided for only the described limited radial movement relative to the rotor body. A shoulder 254, defining a radially outer portion of each recess 54 which does not extend upwardly as far as main portion 154 of the recess, is engageable with the upper end of each blade unit in the radially outer position of the blade unit to prevent upward movement of the blade unit in that position far enough to detach the unit from the rotor body.

After all four of the blade units have been connected to the rotor body in the manner discussed above and illustrated in FIG. 9, the rotor body is slipped upwardly about shaft 27 to the position illustrated in FIG. 2, and is retained in that position by part 46, with the element 49 being clamped between part 46 and the underside of flange 58, so that all of the parts of the beater assembly are rigidly secured together for rotation in unison by motor driven shaft 27.

When it is desired to produce a quantity of frozen product, a cup 95 may be placed on the base 35, or be held upwardly against the underside of a part 96 at the bottom of the chamber structure, with the edge of the cup typically being centered by reception within an annular ring 97 formed on part 96, and with motor 16 in operation and driving the beater assembly rotatively about axis 14, the liquid ingredients are introduced into gap 76 through tube 17. As the ingredients fall downwardly by gravity, they are contacted repeatedly by the blades of the beater assembly, to beat air into the liquid and form a smooth product therefrom, which is progressively frozen as it moves downwardly along refrigerated wall 13 and is ultimately discharged downwardly by element 49 into the cup. The blades are retained by centrifugal force in their radially outer positions in which they are spaced slightly from the chamber wall, and if the product at any time accumulates on the wall to a thickness which might otherwise damage the blades, each of the blade units is free to move radially inwardly a short distance as permitted by grooves 54 and 59, until the excessive thickness of the product can be progressively cut away and advanced downwardly to permit radially outward return of the blade units to their normal positions. The direction of rotation of the beater assembly is in a clockwise direction as viewed looking downwardly from the top of FIG. 1 or FIG. 2, and as will be understood from FIG. 3 the direction of twist of the blades is such that this clockwise rotation tends to advance the product progessively downwardly within the refrigerated chamber. The staggered relationship of the individual blades of the different blade units assures that the product which is advanced downwardly to the level of the lower edge of one of the blades (e.g. edge 77a, 77b, 78 or 79) will engage the upper portion of a blade of the next successive blade unit, to further enhance the downward movement of the product. The downwardly extending portions 82 of the lowermost blades of each blade unit make certain that the entire product is advanced downwardly to part 49, and the latter advances the product downwardly into the cup. The final contact with the product is by the trailing portions of arcuate arms 88 of part 49, so that the surfaces 92 and 93 form essentially flat and essentially coplanar upwardly facing surfaces on the top of the product in the cup, with the projection or rib 90 forming a central arcuately curved groove or line of rounded cross-sectional configuration between the surface areas formed by surfaces 92 and 93 on the product, to give the product a distinctive and attractive appearance.

While a certain specific embodiment of the present invention has been disclosed as typical, the invention is of course not limited to this particular form, but rather is applicable broadly to all such variations as fall within the scope of the appended claims.

I claim:

1. In apparatus for preparing a beaten product including a chamber into which the ingredients of said product are introduced, a motor, and a bearer assembly within the chamber driven rotatively by said motor, an improved beater assembly comprising:

a rotor body driven by said motor rotatively about an essentially vertical axis and having a generally vertically extending portion and vertically spaced upper and lower portions projecting laterally therefrom; and at least one blade unit detachably connectable between said upper and lower portions of the rotor body and including a generally vertically extending structure and angularly disposed blade means projecting outwardly therefrom toward a side wall of said chamber to beat the ingredients as the assembly turns;

said upper portion of the rotor body having a first recess facing downwardly, and said lower portion of the rotor body having a second recess facing upwardly;

said blade unit having an upper projection adapted to extend upwardly into and be retained within said upper recess in a predetermined connected position of the blade unit in which it is carried and supported by the body, and having a lower projection adapted to extend downwardly into and be retained within said second recess in said connected position of the blade unit;

said body and said blade unit and said projections and recesses being constructed and dimensioned to enable movement of the blade unit upwardly and downwardly between said connected position and an elevated position in which said upper projection remains in said first recess but said lower projection is above the level of and withdrawn upwardly from said second recess;

said blade unit in said elevated position being free for swinging movement of said lower projection horizontally between a location above said second recess and an offset position in which the blade unit is insertable upwardly into and removable downwardly from said upper recess for rapid detachment of the blade unit from and rapid attachment to, the body.

2. Apparatus as recited in claim 1, in which said recesses are of greater radial extent than said projections received therein, and said blade unit in said connected position thereof is free for limited movement relative to said rotor body toward and away from the axis thereof.

3. Apparatus as recited in claim 1, in which said vertically extending portion of said rotor body is a tube removably received about a shaft driven by said motor.

4. Apparatus as recited in claim 1, in which said beater assembly includes a plurality of said blade units detachably connectable to said rotor body at locations spaced circularly about said essentially vertical axis thereof and each having upper and lower projections receivable within upper and lower recesses formed by the rotor body.

5. Apparatus as recited in claim 1, in which said vertically spaced upper and lower portions of the rotor body are flanges projecting generally horizontally from said generally vertically extending portion of the rotor body and disposed thereabout.

6. Apparatus as recited in claim 1, in which said vertically spaced upper and lower portions of the rotor body are flanges projecting generally horizontally from said generally vertically extending portion of the rotor body and disposed thereabout, there being a plurality of said blade units detachably connectable between said flanges at locations spaced apart circularly about said essentially vertical axis of the rotor body, each of said blade units having upper and lower projections receivable within first and second recesses formed in said flanges.

7. Apparatus as recited in claim 1, in which said blade means have lower portions which project outwardly a relatively great distance from said essentially vertical axis of the rotor body and have upper portions projecting outwardly a shorter distance from said axis and spaced from the chamber wall.

8. Apparatus as recited in claim 1, in which said blade means have lower portions which project outwardly a relatively great distance from said essentially vertical axis of the rotor body and have upper portions projecting outwardly a shorter distance from said axis and spaced from the chamber wall, there being an inlet passage introducing said ingredients into the chamber at a location radially between said upper portions of the blade means and the chamber wall.

9. Apparatus as recited in claim 1, in which said blade means have lower portions which project outwardly a relatively great distance from said essentially vertical axis of the rotor body and have upper portions projecting outwardly a shorter distance from said axis and spaced from the chamber wall, and a conduit for introducing ingredients into said chamber and extending downwardly into the space between said upper portions of the blade means and the chamber wall.

10. Apparatus as recited in claim 1, in which said upper and lower projections are free for limited movement within said recesses toward and away from said generally vertical axis in a relation mounting said blade unit for limited movement toward and away from the axis, with said blade means in their radially outermost positions being closely proximate but spaced a short distance radially from the side wall of said chamber.

11. Apparatus as recited in claim 1, in which said blade means form at the lower end of said blade unit a blade which extends generally radially outwardly at a level above the lower extremity of said lower projection and then at a location spaced radially outwardly from said lower projection extends downwardly at an outer side of said lower portion of the rotor body to a level at least about as low as the bottom of said lower projection.

12. Apparatus as recited in claim 1, in which said blade means include a series of vertically spaced blades twisted with respect to said generally vertically extending structure, and an upper blade above said first series of blades twisted more abruptly than said series of blades.

13. Apparatus as recited in claim 1, in which said blade means include a series of vertically spaced blades twisted with respect to said generally vertically extending structure, and an upper blade above said first series of blades twisted more abruptly than said series of blades, said first series of blades projecting farther from said generally vertical axis than does said upper blade, with a gap being provided between said upper blade and the side wall of the chamber, there being an inlet conduit extending downwardly into the chamber within said gap for introducing ingredients into the chamber at the location of the gap.

14. Apparatus as recited in claim 1, including a vertical shaft driven by said motor, said generally vertically extending portion of the rotor body being a tube disposed about said shaft and removable downwardly therefrom, there being a retaining element threadedly connected to a lower end of said shaft and retaining said tube thereon, said vertically spaced upper and lower portions of the rotor body being a pair of upper and lower essentially annular flanges carried by and disposed annularly about said tube, there being a plurality of said blade units detachably connectable between said upper and lower flanges at circularly spaced locations and each having upper and lower projections receivable within first and second recesses in the flanges in the relation recited in claim 1 to enable easy detachment of the blade units from the flanges as recited in that claim, said generally vertically extending structure of each blade unit including a rigid vertical member containing a radially outwardly projecting groove, said angularly disposed blade means of each blade unit including a vertically elongated element received and retained partially within said groove and forming a series of radially outwardly projecting blades twisted to beat the product and advance it downwardly as the rotor body turns, said upper and lower projections of the blade units being guided within said recesses for limited radial movement of the blade units relative to the rotor body, said blades of each blade unit including a lower series of blades which are received in closely proximate but spaced relation to a side wall of the chamber in a radially outermost position of the blade and including an upper blade twisted more abruptly than those of the lower series of blades and spaced from the chamber wall a distance greater than the lower series of blades, there being an inlet tube for introducing ingredients into the chamber and projecting downwardly into the space radially between said upper plate and the chamber side wall to introduce ingredients at that location, a lower one of the blades of each blade unit having a radially outer portion which projects downwardly at a location radially outwardly opposite said lower flange.

15. In apparatus for preparing a beaten product including a chamber into which the ingredients of said product are introduced, a motor, and a beater assembly within the chamber driven rotatively by the motor and having blade means, the improvement comprising:

a product discharge element connected to the lower end of said beater assembly and having at least one arm extending generally arcuately about the axis of rotation of the beater assembly and advancing downwardly to an extremity of the arm, said arm having an under surface which presses downwardly against the delivered product in a container thereof and shapes the upper surface thereof, said under surface of the arm near said extremity thereof having two radially spaced generally coplanar portions and an intermediate portion radially between said spaced portions projecting downwardly beyond the common plane thereof to form a circular depression in the upper surface of the product.

16. Apparatus as recited in claim 15, in which said intermediate portion of said under surface of said arm is curved essentially semi-circularly in cross-section.

* * * * *